US006081200A

United States Patent [19]
Park

[11] Patent Number: 6,081,200
[45] Date of Patent: *Jun. 27, 2000

[54] SINGLE ID RADIO PAGER FOR RECEIVING TRAFFIC STATUS DATA

[75] Inventor: Yong-Pal Park, Kyungsangbook-Do, Rep. of Korea

[73] Assignee: LG Semicon Co., Ltd., Cheongju, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/757,626

[22] Filed: Nov. 27, 1996

[30] Foreign Application Priority Data

Dec. 20, 1995 [KR] Rep. of Korea ...................... 95-52881

[51] Int. Cl.[7] ...................................................... H04Q 1/00

[52] U.S. Cl. ............................... 340/825.44; 340/825.26; 340/905

[58] Field of Search ......................... 340/825.44, 825.26, 340/825.27, 905; 455/38.1

[56] References Cited

U.S. PATENT DOCUMENTS

| | | | |
|---|---|---|---|
| 3,824,469 | 7/1974 | Ristenbatt | 340/825.44 |
| 4,473,824 | 9/1984 | Claytor | 340/825.44 |
| 4,477,807 | 10/1984 | Nakajima | 340/825.44 |
| 4,480,253 | 10/1984 | Anderson | 340/825.44 |
| 4,845,491 | 7/1989 | Fascenda | 340/825.44 |
| 5,093,659 | 3/1992 | Yamada | 340/825.44 |
| 5,276,909 | 1/1994 | Milner | 455/38.1 |
| 5,504,476 | 4/1996 | Marrs | 340/825.44 |
| 5,724,644 | 3/1998 | Wassink | 340/905 |

*Primary Examiner*—Brian Zimmerman
*Attorney, Agent, or Firm*—Fleshner & Kim

[57] ABSTRACT

A radio pager includes a decoder for decoding coded data transmitted from a central office at a predetermined interval. The decoder classifies the data into one of traffic information and a call number, and informs a control unit of the result. If the identification information of the received data is identical to the identification information stored in the pager, an address decoder stores the traffic information and a call number in a separate address of a memory according to a control signal of the control unit. In addition to traffic information, various information such as weather, stocks, alternate routes, etc., can be transmitted to the pager to increase its usefulness.

11 Claims, 2 Drawing Sheets

SINGLE ID RADIO PAGER FOR RECEIVING TRAFFIC STATUS DATA

TECHNICAL FIELD

The present invention relates to a pager, and more particularly, a radio pager capable of receiving various types of data including traffic information.

BACKGROUND ART

A cellular telephone and its user fee are too expensive to be sufficiently supplied to everyone. A radio pager is considerably cheaper than the cellular telephone and is capable of easily informing people where and why the user called. Hence, radio pagers are increasingly used instead of the cellular telephone.

As illustrated in FIG. 1, a conventional radio pager includes an antenna and receiver 1 for receiving the call number data transmitted from the central office, an identification read only memory (ID-ROM) 3 for storing an identification ID of the pager, and a comparator 2 for comparing the data received by the receiver 1 with the identification data ID of the pager stored in the ID-ROM 3. The comparator 2 re-transmits the result to the receiver 2 and controller 13.

A memory 6 stores the received call number data, and a first driving unit 9 drives a speaker 11 to generate sound if the ID stored in the ID-ROM 3 and the received call number are the same. A second driving unit 10 turns on a light emitting diode (LED) 12. A displaying unit 8 displays the call number data, the pager's conditions, and time from the buffer 7, which are stored in the memory 6. A timer 5 displays the time and an input key 4 is provided to input time or simple data, such as a telephone number. A control unit 13 controls the operation of each pager component.

The data received from the central office includes, as illustrated in FIG. 2, an address word A and a message word M. The address word A comprises a sequence of one flag bit 1, an address bit 2, a function bit 3, and a check bit 4. In a case of a first message word after an address bit, the message word comprises a sequence of one flag bit 1, a selection code 5, a pure message 6 and a check bit 4. The pure message word 6 is repeated twice after an address word A.

As shown, the conventional radio pager is configured to receive only the call number, although the pager has enough capacity to supply several types of data. As a result, the usage of the conventional pager is very limited.

SUMMARY OF THE INVENTION

An object of the invention is to solve the problems of the prior art.

An advantage of the present invention is in increasing the usefulness of a pager.

Another advantage of the present invention is in supplying traffic information with the call number.

According to the present invention, the foregoing and other advantages are achieved in part by a radio pager comprising a decoder for receiving data transmitted from a central office after being coded at a predetermined interval, classifying the data into traffic information and a call number, and informing a control unit of the result; and an address decoder for separately storing addresses of traffic information and a call number according to a control signal of the control unit, if the received data is traffic information or a call number and is identical with his or her ID number.

The pager may also comprise means for receiving data containing identification, call number, and at least one of traffic information, weather, stocks, and alternate route information; means for confirming that received identification is identical to a predetermined identification of the pager; means for storing the call number and at least one of traffic information, weather, stocks and alternate route information; means for conveying such information to a user; and a controller connected such that the controller controls the operation of each means.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements.

BEST MODE FOR CARRYING OUT THE INVENTION

Figure 1:
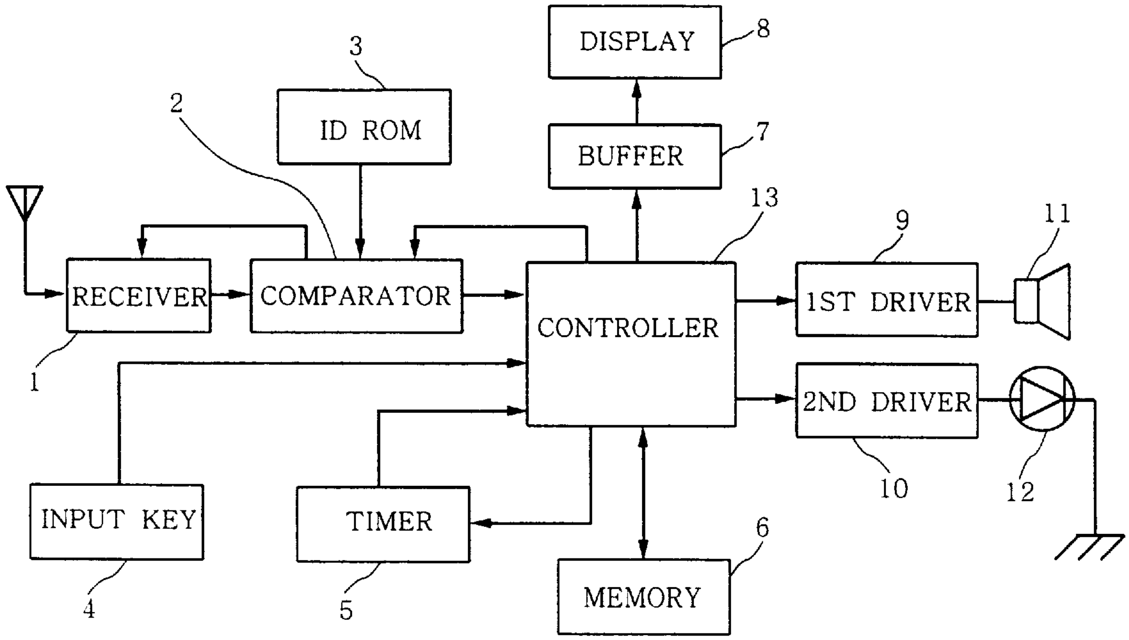
FIG.1 CONVENTIONAL ART
FIG. 1 is a block diagram of a conventional radio pager.
Figure 2:
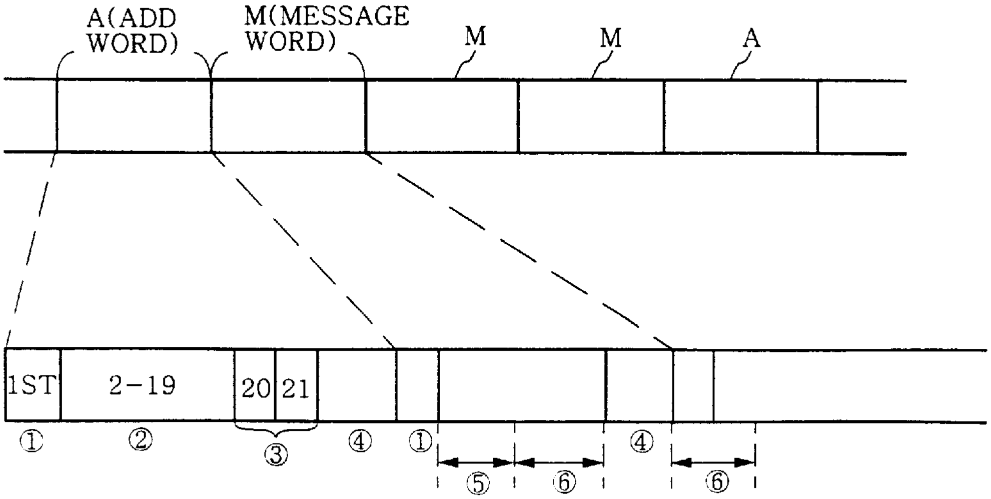
FIG.2 CONVENTIONAL ART
FIG. 2 is a diagram of data configuration of a conventional radio pager.
Figure 3:
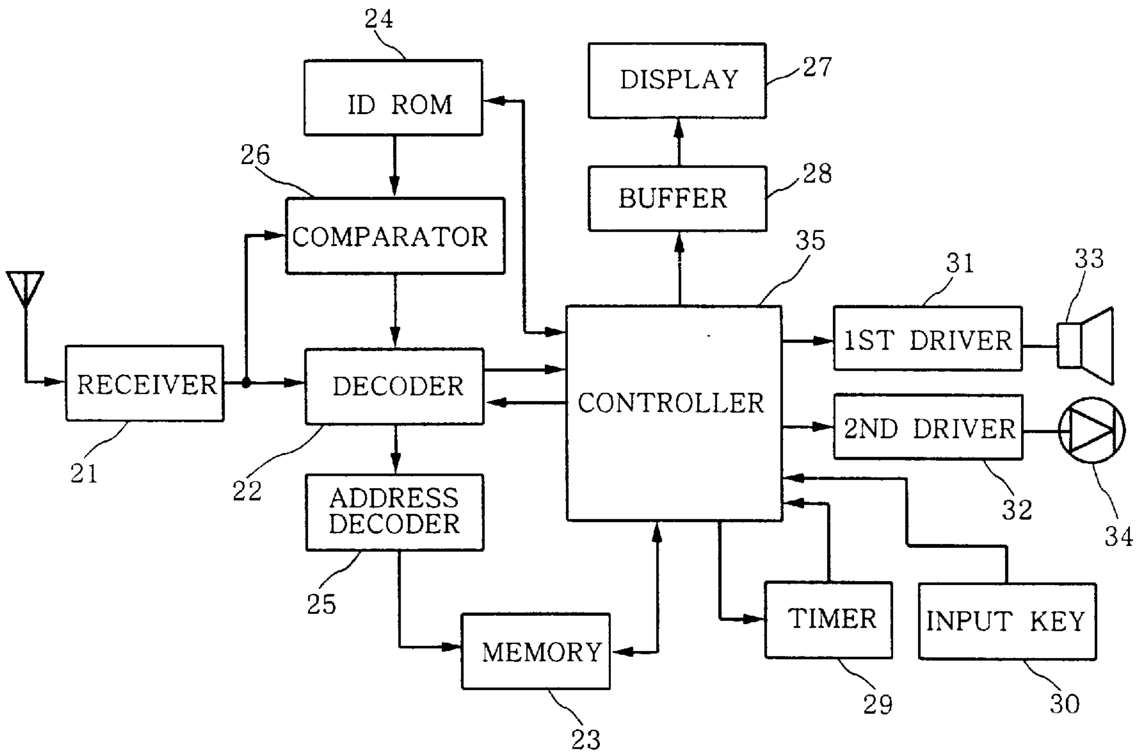
FIG. 3 is a block diagram of a radio pager of the invention.

As illustrated in FIG. 3, the radio pager of the invention includes an antenna and receiver 21 for receiving coded traffic information and a call number transmitted from the central office at a predetermined interval. A decoder 22 classifies the data received by the receiver 21 into traffic information and call number. The classification result is transmitted to a control unit 35, and a comparator 26 compares the data received from the central office with an identification data ID stored in an ID-ROM 24. An address decoder 25 decodes the addresses of the traffic information and the call number in accordance with the control signal of the control unit 35.

A memory 23 stores the traffic information and call number to the respective corresponding addresses in accordance with the decoding result of the address decoder 25. A first driving unit 31 drives a speaker 33 in order to inform the user if the received call number is the same, and a second driving unit 32 turns on a light emitting diode LED 34. A displaying unit 27 displays the call number data, data of the pager's conditions, and time from the buffer 28 which are received in the memory 8. A timer 5 displays the time, and the control unit 35 being responsive to an input key 4 and controlling the operation of the respective components.

Figure 4:
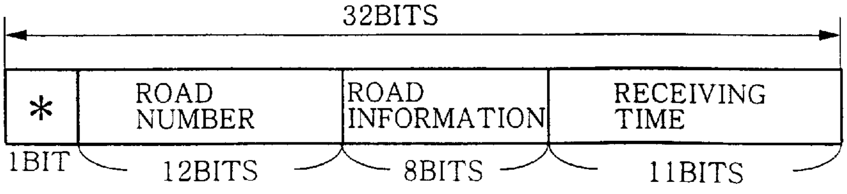
FIG. 4 is a diagram of traffic data configuration of a radio pager.

The traffic information, which is coded at a predetermined interval in the central office, is, for example, 32 bits in total data length, as illustrated in FIG. 4. A first bit is a classification bit for indicating the traffic information. The twelve (12) succeeding bits display a road number, road name, or information to identify a particular road and the next eight (8) bits contain information of road such as traffic information. The eleven (11) remaining bits display the receiving time. The traffic information is displayed only when the user selects the corresponding mode.

In the present invention, the central office codes and transmits the traffic information at a predetermined interval, as well as the call number. The radio pager receives the data and if the data is the call number, the pager performs the operation described above. If the data is the traffic information, the pager stores the traffic information in the memory 23 in a predetermined order to allow the user to retrieve and see the data when needed. For example, the user can avoid the jammed road in case he or she receives the traffic information in a car. In addition to the traffic information, he or she can be provided with various types of information such as alternate roads to travel due to traffic, weather forecast, stock price, etc.

As described above, the radio pager of the present invention has various usefulness to the user, besides the call number. It should be understood that the detailed description and specific embodiment are given by way of illustration only, since various changes and modifications within the spirit and scope of the invention will become apparent to those skilled in the art from the detailed description. Hence, it is understood that the present invention may be practiced otherwise than as specifically described within the scope of the appended claims.

I claim:

1. A pager comprising:

means for receiving data containing an identification call number or traffic information transmitted from a central office at a predetermined interval, wherein sequential receipt of said received data provides the identification call number and the traffic information to the pager;

first means for decoding and classifying said received data into the traffic information and the identification call number;

first means for storing an identification data of the pager, wherein the identification data of the pager consists of a pager ID;

means for comparing an identification of the received data with said stored identification data;

second means for decoding and separately storing addresses of the received traffic information and the identification call number of the received data according to a control signal only when the identification of the received data matches said stored identification data of the pager;

second means for separately storing in corresponding memory addresses said identification call number and said traffic information only when the identification of the received data matches said stored identification data of the pager;

means for conveying such traffic information to a user; and a controller means connected for operably controlling the operation of the first and second means for decoding and first and second means for storing.

2. The pager of claim 1, wherein said receiving data means comprises an antenna and a receiver.

3. The pager of claim 1 further comprising an input device coupled to said controller means, an operating mode of the pager being determined by inputs from said input device.

4. The pager of claim 1 further comprising means for alerting a user of receipt of data.

5. The pager of claim 4, wherein said alerting means comprises:

a first driver connected to said controller means; and a speaker connected to said first driver.

6. The pager of claim 4, wherein said alerting means comprises:

a visual driver connected to said controller means; and a light emitting diode connected to said visual driver.

7. The pager of claim 1, wherein said conveying means comprises:

a buffer connected to said controller means to store said call number and traffic information; and a display unit connected to said buffer to display data from said buffer.

8. The pager of claim 1, wherein said traffic information is composed of 32 bits in the sequence of classification bit, road number bits, road information bits and receiving time bits.

9. A pager, comprising:

means for receiving data containing a first message having an identification call number or a second message having status information transmitted from a central office at a predetermined interval, wherein sequential receipt of said received data provides the identification call number and the status information to the pager;

first means for decoding and classifying said received data into the status information and the identification call number;

first means for storing an identification data of the pager, wherein the identification data of the pager consists of a pager ID;

means for comparing an identification of the received data with said stored identification data;

second means for decoding and separately storing addresses of the received status information and the identification call number of the received data according to a control signal only when the identification of the received data matches said stored identification data of the pager;

second means for separately storing in corresponding memory addresses said identification call number and said status information only when the identification of the received data matches said stored identification data of the pager;

means for conveying such status information to a user; and a controller means connected for operably controlling the operation of the first and second means for decoding and first and second means for storing.

10. The pager of claim 9, wherein the status information is traffic information.

11. The pager of claim 9, wherein the status information is weather information.

* * * * *